(12) United States Patent
Qiu et al.

(10) Patent No.: US 8,521,201 B2
(45) Date of Patent: Aug. 27, 2013

(54) CHANNEL ASSIGNMENT OPTIMIZATION METHOD AND CHANNEL ASSIGNMENT OPTIMIZATION APPARATUS

(75) Inventors: Jigang Qiu, Shanghai (CN); Feng Yang, Shanghai (CN); Binyang Xu, Shanghai (CN)

(73) Assignee: Alcatel Lucent, Paris (FR)

( * ) Notice: Subject to any disclaimer, the term of this patent is extended or adjusted under 35 U.S.C. 154(b) by 166 days.

(21) Appl. No.: 13/255,444

(22) PCT Filed: Jan. 11, 2010

(86) PCT No.: PCT/CN2010/000041
§ 371 (c)(1),
(2), (4) Date: Sep. 8, 2011

(87) PCT Pub. No.: WO2010/102506
PCT Pub. Date: Sep. 16, 2010

(65) Prior Publication Data
US 2012/0009958 A1    Jan. 12, 2012

(30) Foreign Application Priority Data
Mar. 9, 2009   (CN) .......................... 2009 1 0047429

(51) Int. Cl.
*H04B 7/00* (2006.01)
*H04W 72/00* (2009.01)

(52) U.S. Cl.
USPC ........ 455/507; 455/450; 455/452.1; 455/453; 455/510

(58) Field of Classification Search
USPC ............. 455/11.1, 446, 449, 450, 453, 452.1, 455/509, 507, 510
See application file for complete search history.

(56) References Cited

U.S. PATENT DOCUMENTS

| | | | | |
|---|---|---|---|---|
| 6,230,016 B1 * | 5/2001 | Benveniste | ................... | 455/450 |
| 6,445,924 B1 * | 9/2002 | Rasanen | ....................... | 455/437 |
| 7,184,772 B2 * | 2/2007 | Lim et al. | ..................... | 455/450 |
| 7,386,317 B2 * | 6/2008 | Boyer et al. | .................. | 455/447 |
| 8,078,183 B2 * | 12/2011 | Guoqing | ..................... | 455/450 |
| 2004/0254974 A1 | 12/2004 | Khamfallah | | |

FOREIGN PATENT DOCUMENTS

| CN | 1430431 A | 7/2003 |
|---|---|---|
| CN | 1815933 A | 8/2006 |
| CN | 101227701 A | 7/2008 |

OTHER PUBLICATIONS

International Search Report for PCT/CN2010/000041 dated Apr. 22, 2010.

* cited by examiner

*Primary Examiner* — Andrew Wendell
*Assistant Examiner* — Maryam Soltanzadeh
(74) *Attorney, Agent, or Firm* — Fay Sharpe LLP

(57) ABSTRACT

The present invention provides a multi-iteration based channel assignment optimization method and a channel assignment optimization apparatus. The channel assignment optimization method comprises a channel assignment optimization path searching phase and a channel switching phase. During the channel assignment optimization path searching phase, the IBS negotiates with neighboring base stations so as to detect a channel assignment optimization path through multiple iterations. Merely after successfully detecting a feasible channel assignment optimization path, IBS and its neighboring base stations initiate a channel switching process, such that useless channel switching may be avoided. Besides, in order to avoid the problem of incapability of timely convergence during the iteration process, a threshold of iteration times is preset. Once the current iteration times is greater than the threshold, the channel assignment optimization path searching process on the current channel will exit and then the process switches to other channel to detect another path.

14 Claims, 7 Drawing Sheets channel use state of neighboring base stations of IBS (BS 5)

CHANNEL ASSIGNMENT OPTIMIZATION METHOD AND CHANNEL ASSIGNMENT OPTIMIZATION APPARATUS

FIELD OF THE INVENTION

The present invention relates to a channel assignment mization method and a channel assignment optimization apparatus, and in particular, to a channel assignment optimization method that is implemented through a multi-iteration channel switching process and corresponding channel assignment optimization apparatus.

DESCRIPTION OF THE RELATED ART

In spectrum sharing, it is paramount to assign wireless channels to different systems in a suitable manner, thereby realizing better co-existence among different systems. On one hand, it is required to assign different channels to neighboring systems that have overlapped coverage scopes, so as to avoid co-channel interference between the neighboring systems. As illustrated in FIG. 1, because system 1 and system 2 are adjacent, it is required to assign different channels to system 1 and system 2, such that the transmission between BS (base station) 1 and SS (subscriber station) 1 that is affiliated to BS1 will not generate interference to the communication link between BS 2 and SS2 that is affiliated to BS2. On the other hand, it is required to guarantee that as more as possible systems may be assigned dedicated channels to fulfill their transmission demands. Otherwise, those systems that fail to be assigned dedicated transmission channels have to share wireless channels with other systems, and they even have to suspend their current transmission work. Apparently, in this case, spectrum utilization will drop, and the QoSs (quality of service) of the services cannot be well guaranteed. In other words, effective co-existence cannot be realized among systems.

Generally, in spectrum sharing, there is no a global central controller to realize cross-system wireless resource management. Besides, a central controller is needed to collect/maintain much information so as to realize cross-system global channel assignment optimization in a centralized mode. Further, dynamic variation of network topology will aggravate the burden on propagating such information. Thus, the centralized global channel assignment optimization manner can hardly be applied in the actual network construction. In this case, an alternative manner is to realize channel assignment in a distributed mode, wherein each system adaptively selects its own working channel.

Currently, the IEEE 802.16h standard stipulates a process of channel assignment optimization, so as to obtain a dedicated channel for IBS (initialization base station): first, the IBS attempts to detect an idle (without interference) channel during the spectrum sensing process; if the IBS fails to detect any idle channel, an idle channel should be vacated as its dedicated working channel by switching the working channel of its neighboring base stations to other idle channels, i.e., by changing: the channel distribution of its neighboring system.

However, the IEEE 802.16h merely defines a single-hop channel distribution optimization mechanism, which means the IBS merely requires its neighboring base stations to switch the working channel so as to vacate an idle channel for itself. If the IBS cannot detect: an backup idle channel exists in all neighboring base stations working on a channel, the IBS cannot obtain an idle channel as its dedicated channel through the process of channel assignment optimization as defined in 802.16h.

FIG. 2 illustrates a schematic diagram of initial channel assignment for IBS (BS 5) and its neighboring base stations and the initial channel assignment information before an idle channel is obtained as a working channel. As illustrated in FIG. 2, the initial channel assignment information of IBS comprises IDs of neighboring base stations working on each channel and the backup idle channels of these neighboring base stations, wherein BS1, BS2, BS4, BS6, BS7, and BS8 are all neighboring base stations of BS5, while BS3 and BS9 are neighboring base stations of the neighboring base stations of BS5. Suppose there are three channels that may be assigned to each base station. Here, they are represented by different shadows.

As illustrated in FIG. 2, both BS1 and BS 7 work on channel 1. However, BS 7 has no backup idle channel, thus BS 5 cannot request BS 7 and BS1 to switch to other channels for vacating channel 1 as the working channel of BS 5, although BS1 has channel 3 as the backup idle channel. Similarly, BS 5 cannot request the neighboring base stations working on channel 2 or channel 3 to switch to other channel so as to vacate channel 2 or channel 3 as its working channel, because none of these neighboring base stations working on channel 2 or channel 3 has a backup idle channel. In this case, if the channel assignment optimization mechanism as defined in 802.16h is employed, the BS 5 has to suspend its transmission or share a channel with other neighboring base station(s) to transmit a service message. However, if the current channel assignment may be changed to the channel assignment situation as illustrated in FIG. 3 through a mechanism, then BS 5 may obtain a dedicated working channel. Apparently, in this case, compared with the channel assignment optimization mechanism as defined in 802.16h, this new mechanism may improve the spectrum efficiency and more effectively guarantee the service of quality (QoS) of the BS 5.

Thus, it is desired to design a channel assignment optimization mechanism so as to enable a better co-existence among systems.

SUMMARY OF THE INVENTION

The present invention provides a multi-iteration based distributed channel assignment optimization mechanism.

A basic channel assignment optimization process is divided into two phases: the channel assignment optimization path searching phase, and the channel switching phase. During the channel assignment optimization path searching phase, the IBS negotiates with other base stations so as to detect a channel assignment optimization path through multiple iterations. After successfully detecting a channel assignment optimization path, IBS and other neighboring base stations initiate a channel switching process, such that useless channel switching may be avoided.

Besides, in order to avoid the problem of incapability of timely convergence during the iteration process, a threshold of iteration times is preset. Once the current iteration times is greater than the threshold, the channel assignment optimization path searching process on the current channel will exit and then the process switches to other channel to detect another path.

According to one aspect of the present invention, there is provided a channel assignment optimization method in a communication system, wherein the communication system comprises an initialization base station, and multi-stage neighboring base stations of the initialization base station.

At a current-stage neighboring base station among the multi-stage neighboring base stations, the method comprises steps of: receiving a channel assignment optimization testing message from an upper-stage neighboring base station; determining whether there is a channel all lower-stage neighboring base stations working on the channel have a respective backup idle channel; if there is a channel all lower-stage neighboring base stations working on the channel have a respective backup idle channel, sending a channel assignment optimization response message having "feasible" indication to the upper-stage neighboring base station; and when a channel switching request message is received from the upper-stage neighboring base station, requesting all lower-stage neighboring base stations that work on the channel to switch to their respective backup idle channel; after a channel switching response message having "success" indication is received from each of all lower-stage neighboring base stations, sending a channel switching response message having "success" indication to the upper-stage neighboring base station, and making the current-stage neighboring base station work on the channel.

At the current-stage neighboring base station, the method further comprises: if there is no channel all lower-stage neighboring base stations working on the channel have a respective backup idle channel, determining whether the stage number of the current-stage neighboring base station exceeds a predetermined threshold; if it exceeds the predetermined threshold, sending a channel assignment optimization response message having "infeasible" indication to the upper-stage neighboring base station; if it does not exceed the predetermined threshold, then classifying each channel based on the number of lower-stage neighboring base stations working thereon; a) determining whether there still have channels that are available for testing; if there are no channels that are available for testing, then sending a channel assignment optimization response message having "infeasible" indication to the upper-stage neighboring base station; if there still have channels that are available for testing, then selecting a channel that has least number of lower-stage neighboring base stations working thereon from the channels that are available for testing, as the backup optimization channel of the current-stage neighboring base station; and sending a channel assignment optimization testing message to each of all lower-stage neighboring base stations that work on the selected channel At the current-stage neighboring base station, the method further comprises steps of: determining whether each of all channel assignment optimization testing messages receives a channel assignment optimization response message having "feasible" indication; if not each of all channel assignment optimization testing messages receives a channel assignment optimization response message having "feasible" indication, returning to a); if each of all channel assignment optimization testing messages receives the channel assignment optimization response message having "feasible" indication, sending a channel assignment optimization response message having "feasible" indication to the upper-stage neighboring base station; when receiving a channel switching request message from the upper-stage neighboring base station, requesting all lower-stage neighboring base stations working on the selected channel to their respective backup optimization channel or backup idle channel; after a channel switching response message having "success" indication is received from each of all lower-stage neighboring base stations, sending a channel switching response message having "success" indication to the upper-stage neighboring base station, and making the current-stage neighboring base station work on the selected channel.

At the initialization base station, the method comprises steps of: in the case of determining that no idle channel exists and there is no channel all first-stage neighboring base stations working thereon have a respective backup idle channel, classifying each channel based on the number of first-stage neighboring base stations working thereon; determining whether there still have channels that are available for testing; if there still have channels that are available for testing, selecting a channel that has least number of first-stage neighboring base stations from the channels that are available for testing, as the backup optimization channel of the initialization base station; sending a channel assignment optimization testing message to each of first-stage neighboring base stations that work on the selected channel.

At the initialization base station, the method further comprises steps of: when receiving a channel switching response message having "success" indication from each of all the first-stage neighboring base stations, making the initialization base station work on its backup optimization channel, the backup optimization channel being the idle channel that is vacated by the fist-stage neighboring base stations for the ion base station.

Preferably, the initialization base station and the multi-stage neighboring base stations of the initialization base station all maintain the information about the channel assignment optimization path searching result, so as to calculate the most optimal channel assignment optimization path based on the information.

If switching failure occurs at any stage neighboring base stations, the switching that has been completed at each of lower stages is restored to the original state, and a channel switching response message having "failure" indication is sent to the upper-stage neighboring base station. When the channel switching response message having "failure" indication is forwarded upward stage by stage to the initialization base station, determining whether there still have channels that are available for testing; if there still have channels that are available for testing, selecting a channel that has least number of first-stage neighboring base stations from the channels that are available for testing, as the backup optimization channel of the initialization base station; sending a channel assignment optimization testing message to each of all first-stage neighboring base stations that work on the selected channel.

According to another aspect of the present invention, there is provided a channel assignment optimization apparatus in a communication system, wherein the communication system comprises an initialization base station, and multi-stage neighboring base stations of the initialization base station, at a current-stage neighboring base station among the multi-stage neighboring base stations, the channel assignment optimization apparatus comprises:

a channel assignment optimization path searching means configured to receive a channel assignment optimization testing message from an upper-stage neighboring base station; determine whether there is a channel all lower-stage neighboring base stations working thereon have a respective backup idle channel; if there is a channel all lower-stage neighboring base stations working thereon have a respective backup idle channel, send a channel assignment optimization response message having "feasible" indication to the upper-stage neighboring base station; and channel switching means, configured to when a channel switching request message is received from the upper-stage neighboring base station, request all lower-stage neighboring base stations working on the selected channel to switch to their respective backup optimization channel or backup idle channel; when a channel switching response message having "success" indication is received from each of all lower-stage neighboring base stations, send a channel switching response message having "success" indication to the upper-stage neighboring base station, and switch the working channel of the current-stage neighboring base station to the selected channel.

At the current stage neighboring base station, the channel assignment optimization path searching means is further configured to: if there is no channel all lower-stage neighboring base stations working thereon have a respective backup idle channel, determine whether the stage number of the current-stage neighboring base station exceeds a predetermined threshold; if it exceeds the predetermined threshold, then send a channel assignment optimization response message having "infeasible" indication to the upper-stage neighboring base station; if it does not exceed the predetermined threshold, classify each channel based on the number of lower-stage neighboring base stations that work thereon; a) determine whether there still have channels that are available for testing; if there are no channels that are available for testing, send a channel assignment optimization response message having "infeasible" indication to the upper-stage neighboring base station; if there still have channels that are available for testing, select a channel that has least number of first-stage neighboring base stations from the channels that are available for testing, as the backup optimization channel of the current-stage base station; and send a channel assignment optimization testing message to each of all lower-stage neighboring base stations that work on the selected channel.

At the current stage neighboring base station, the channel assignment optimization path searching means is further configured to: determine whether each of all channel assignment optimization testing messages obtains a channel assignment optimization response message having "feasible" indication; if not each of all channel assignment optimization testing messages obtains a channel assignment optimization response message having "feasible" indication, return to a); if each of all channel assignment optimization testing messages receives the channel assignment optimization response message having "feasible" indication, send a channel assignment optimization response message having "feasible" indication to the upper-stage neighboring base station.

At the initialization base station, the channel assignment optimization apparatus comprises: channel assignment optimization path searching means configured to when it is determined no idle channel exists and there is no channel all first-stage neighboring base stations working thereon have a respective backup idle channel, classify each channel based on the number of first-stage neighboring base stations working thereon; determine whether there still have channels that are available for testing; if there are still channels that are available for testing, select a channel that has least number of first stage neighboring base stations from the channels that are available for testing, as the backup optimization channel of the initialization base station; send a channel assignment optimization testing message to each of all first-stage neighboring base stations working on the selected channel.

At the initialization base station, the channel assignment optimization apparatus comprises: channel switching means configured to: if each of all channel assignment optimization testing messages that are sent to the first-stage neighboring base stations obtains a channel assignment optimization response message having "feasible" indication, request all lower-stage neighboring base stations working on the selected channel to switch to their respective optimization channel or backup idle channel when sending a channel switching request message to the corresponding first-stage neighboring base station. When a channel switching response message having "success" indication is received from each of all the first stage neighboring base stations, switch the working channel of the initialization base station to its backup optimization channel, the backup optimization channel being the idle channel that is vacated by the first stage neighboring base stations for the initialization base station Preferably, the channel assignment optimization apparatus further comprises: means for saving the information about the channel assignment optimization path searching result at the initialization base station and the multi-stage neighboring base stations of the initialization base station; and means for calculating the most optimal channel assignment optimization path based on the information.

The channel switching means is configured to: if switching failure occurs at any stage neighboring base stations, restore the switching that has been completed at each of lower stages to the original state, and send a channel switching response message having "failure" indication to the upper-stage neighboring base station.

At the initialization base station, when the channel switching means receives a channel switching response message having "failure" indication, the channel assignment optimization path searching means is configured to: determine whether there still have channels that are available for testing; if there are still channels that are available for testing, select a channel that has least number of first stage neighboring base stations from the channels that are available for testing, as the backup optimization channel of the initialization base station; send a channel assignment optimization testing message to each of all first stage neighboring base stations that work on the selected channel.

DETAILED DESCRIPTION OF THE INVENTION

Figure 1:
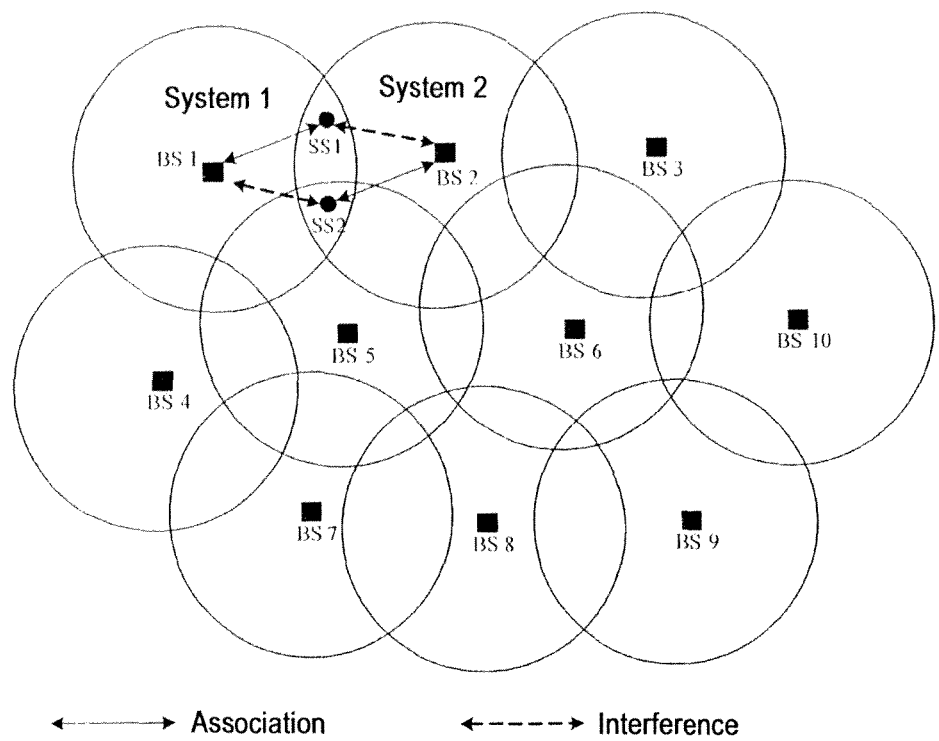
FIG. 1 illustrates a generic network scenario in the case of co-existence of multiple systems, in which scenario, it is required to perform an optimization channel assignment mechanism so as to improve the spectrum efficient.

In order to implement optimization channel assignment, the present invention provides a distributed solution based on a multi-iteration channel switching process. Namely, the IBS may change channel assignment of neighboring base stations through one iteration process or change channel assignment of neighboring base stations of neighboring base stations through a secondary iteration process . . . till the maximum iteration times is reached, so as to vacate an idle channel as its dedicated working channel.

A basic channel assignment optimization process is divided into two phases: the channel assignment optimization path searching phase, and the channel switching phase. In the channel assignment optimization path searching phase, the IBS negotiates with other base stations to detect a channel assignment optimization path, i.e., which base stations need switching their current working channels to which channels so as to vacate an idle channel. During the channel switching phase, each base station on the channel assignment optimization path switches in sequence the current working channel to a possible channel that is determined in the channel assignment optimization path searching phase.

It should be noted that the direction of channel assignment optimization path searching is inverse to the actual channel switching. Namely, the direction of searching the channel assignment optimization path is: IBS→neighboring base stations of IBS→neighboring base stations of neighboring stations of IBS→ . . . ; while the direction of channel switching is: . . . →neighboring base stations of neighboring stations of IBS→neighboring base stations of IBS→IBS.

It should be noted that during the channel assignment optimization path searching phase, each base station should save the information about the channel assignment optimization path searching result; thus, when performing the channel assignment optimization path searching in the future, the system may quickly detect the channel assignment optimization path using the saved information about channel assignment optimization path. Besides, some distance—vector algorithms (for example Bellman-Ford algorithm) may be used to calculate an optimal path of channel assignment optimization (it may employ the least number of channel switches as a measurement standard), so as to vacate an idle channel for the IBS.

Let NB (1) represent neighboring base stations (first stage neighboring base stations) of IBS; let NB (2) represent neighboring base stations of neighboring base stations of IBS, i.e., neighboring base stations of NB (1) (for the sake of illustration, it is here called second stage neighboring base stations of IBS); . . . ; let NB (k) represent neighboring base stations of NB (k–1) (kth stage neighboring stations of IBS). Let NB (1)–ChX represent first stage neighboring base stations working on channel X; let NB (1)–ChX–1 represents first stage neighboring base station 1 working on the channel X; let NB (2)–ChX represent second stage neighboring base stations working on the channel X, . . . ; let NB (k)–ChX represent the kth stage neighboring base stations working on the channel X.

Based on the channel assignment optimization solution as prescribed in the IEEE 802.16h standard, if the IBS may detect an idle channel through listening, it may directly select the idle channel as its dedicated working channel. If no idle channel is detected, then IBS determines whether such channel exists: all NB (1) working on the channel have a respective backup idle channel. In the case of existence (suppose this channel is channel X), then IBS sends a "channel switching request" message to each of NB (1)–ChX to request that each of NB (1)–ChX should be switched to its backup idle channel. If the "channel switching request" message is received, then each of NB (1)–ChX is switched to its backup idle channel, and then the IBS may obtain channel X as its dedicated working channel. If such channel does not exist, IBS has to share a channel with other system(s) or suspend its transmission of service message.

Figure 4:
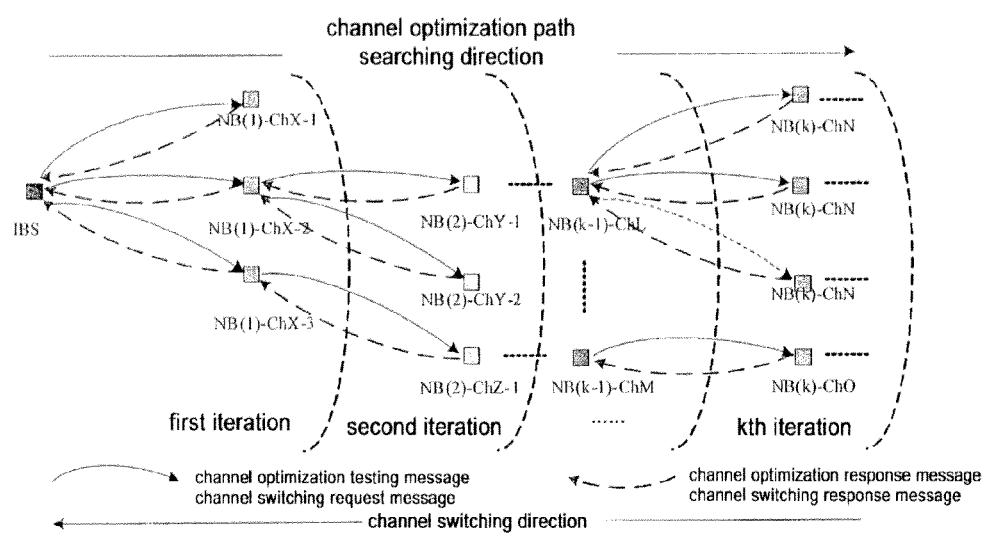
FIG. 4 illustrates a multi-iteration based channel assignment optimization process according to the present invention.

However, according to the present invention, in the case that there is no such channel all NB (1) working on the channel have a respective backup idle channel, an idle channel may be vacated for the IBS through a multi-iteration based channel assignment optimization process. Hereinafter, referring to FIG. 4, the multi-iteration based channel assignment optimization process according to the present invention will be described.

1) IBS classifies these channels based on the number of NB (1) working on each channel, and selects the channel that has least number of NB (1) (this channel is marked as channel X).

2) the IBS sends a "channel assignment optimization testing" message to each of NB (1)–ChX. After receiving the "channel assignment optimization testing" message, each of NB (1)–ChX determines whether there is a channel all NB (2) working on the channel have a respective backup idle channel.

3) if each of NB (1)–ChX detects existence of such channel (this channel is marked as channel Y) all NB (2) working on the channel have a respective backup idle channel, then each of NB (1)–ChX sends to the IBS a "channel assignment optimization response" message having "feasible" indication.

For example, NB (1)–ChX–1 may detect such channel all neighboring base stations working on the channel may vacate an idle channel for NB (1)–ChX–1 through switching their current working channel to the respective backup idle channel. In this case, NB (1)–ChX–1 will send to the IBS a "channel assignment optimization response" message having "feasible" indication.

4) if no such channel is detected, then NB (1)–ChX will further request their neighboring base stations to adopt the channel assignment optimization path searching process, respectively. If the neighboring base stations of NB (1)–ChX successfully detect optimization paths that may vacate channels for NB (1)–ChX, then NB (1)–CIA will send to the IBS "channel assignment optimization response" messages having "feasible" indication: otherwise, they will send to the IBS "channel assignment optimization response" messages having "infeasible" indication.

5) after receiving the "channel assignment optimization testing" message from its NB (k–1)–ChM, each neighboring base station (for example, NB (k)–ChN) performs an operation similar to the operations of NB (1)–ChX to detect the optimization path. Through this path, a channel N may be vacated for corresponding NB (k–1)–ChM. Besides, in order to avoid endlessly performing this iteration process (i.e., convergence problem), a threshold for iteration times will be preset. Thus, during the channel assignment optimization path searching phase, if the corresponding NB (k) detects iteration times>the threshold, then it will not request its neighboring lower stage base stations to initiate the channel assignment optimization path searching process. In this case, a "channel assignment optimization response" having "infeasible" indication will be sent to its NB (k–1)–ChM.

6) The NB (1)-ChX should maintain the information about the channel assignment optimization path searching result, comprising channel switching times, the base station ID that sends the path searching request, and the channel desired to be switched to, etc.

7) If the IBS receives all "channel assignment optimization response" messages having "feasible" indication, then it successfully detects a feasible channel assignment optimization path. Through the channel switching operations of the base stations on the path, an idle channel may be vacated for the IBS, thus the IBS will turn into the channel switching phase.

8) If the IBS receives any "channel assignment optimization response" message having "infeasible" indication from a neighboring base station (IBS sends a request thereto) or does not receive certain response message to the "channel assignment optimization testing" message after waiting for a predetermined time, it indicates that it is impossible to vacate the channel currently under test to be available for the IBS through the channel switching process. Thus, the IBS will attempt to perform a similar channel assignment optimization process on other channels. Namely, the IBS will select a possible channel that has least number of NB (1) from the remaining channels to continue executing steps 2), 3), 4), 5), 6), and 7) to detect the optimization path.

9) If all channels are tested without detecting an optimization channel, then the IBS cannot successfully obtain an idle channel as its dedicated working channel through the channel assignment optimization process. In this case, the IBS must suspend its transmission, or has to share a channel with its neighboring base stations to realize message transmission.

Suppose an idle channel may be vacated for the IBS through "a" times of iteration processes. Namely, NB (a) are the end of the optimization path. During the channel switching process, each base station on the optimization path switches in sequence the current channel to the selected channel based on the switching manner as determined during the channel assignment optimization path searching phase.

1) The IBS sends a "channel switching request" message to the neighboring base stations (namely, NB (1)) on a given channel as determined through the optimization path, and then each of NB (1) on this channel forwards it to its neighboring base stations (NB(2)) through the given channel that is determined through the optimization path, . . . , until each of NB (a) on the optimization path receives the "channel switching request" message. Suppose these NB (a) on the optimization path work on the channel Z.

2) Each of NB (a)–ChZ attempts to switch its working channel from channel Z to its backup idle channel. After switching the working channel to its backup idle channel, each of NB (a)–ChZ sends a "channel switching response" message having "success" indication to its NB (a–1) to acknowledge the "channel switching request" message.

3) After receiving all "channel switching response" messages having "success" indication, the corresponding NB (a–1) switches its working channel to channel Z, and then it sends the "channel switching response" message to NB (a–2), . . . .

4) After all "channel switching response" messages having "success" indication are received from the NB (1), the IBS successfully obtains the idle channel as its dedicated working channel through multiple iterations of channel switching process.

Hereinafter, referring to FIG. 5, the method flow that implemented by IBS according to the channel assignment optimization mechanism that is iterated for multiple times according to the present invention will be described in detail.

Figure 5:
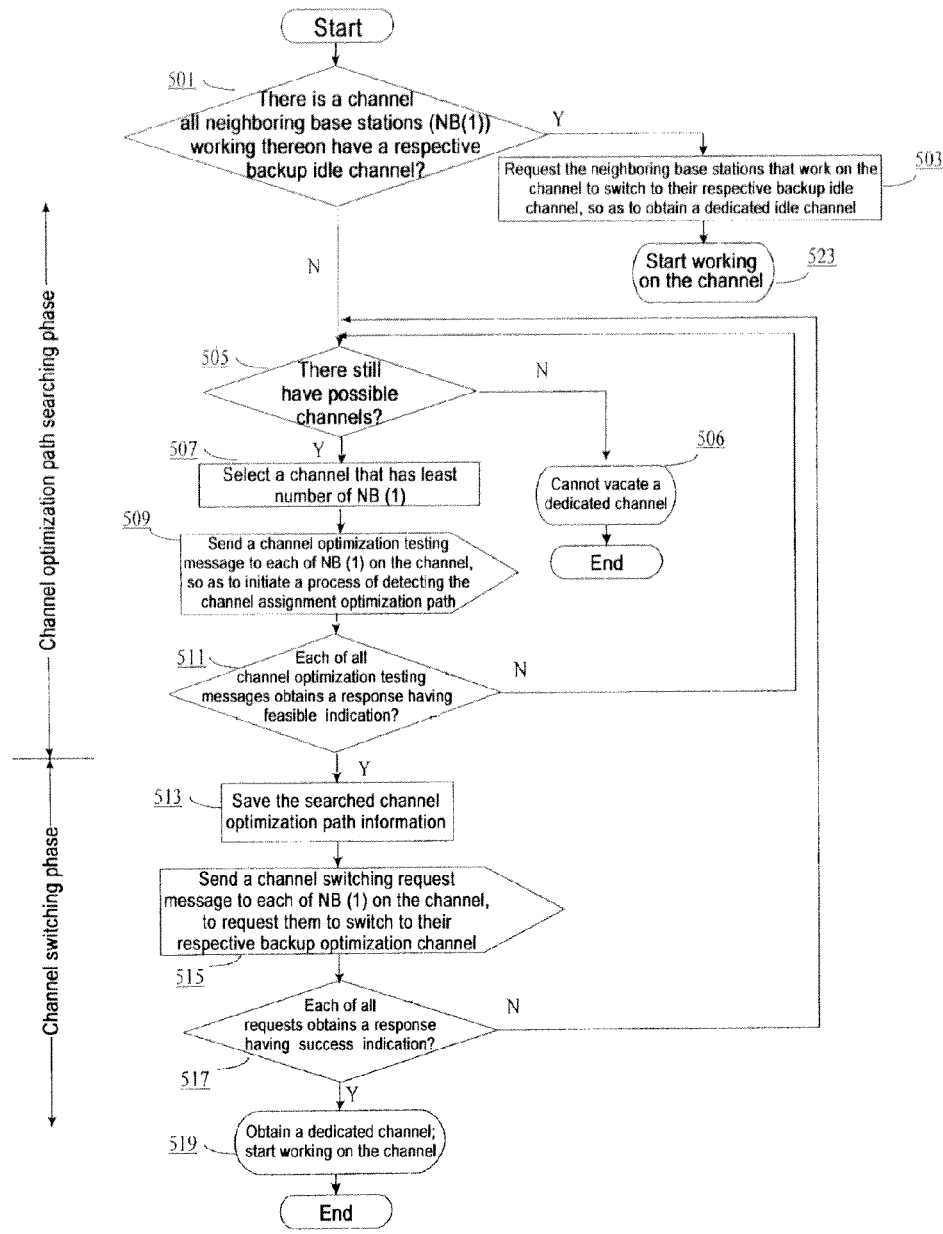
FIG. 5 illustrates a method flow that is implemented by an initialization base station IBS according to the channel assignment optimization mechanism that is iterated for multiple times according to the present invention.

As illustrated in FIG. 5, at step 501, if there is a channel all NB (1) working on the channel have a respective backup idle channel, then at step 503, it requests that all NB (1) working on the channel switch to their respective backup idle channel, such that the IBS obtains an idle channel as its dedicated working channel (step 523).

Otherwise, the IBS will enter into step 505 to determine whether all channels have been tested. If there have channels that have not been tested yet, the IBS selects the first stage working channel (marked as channel X) having the least number of NB (1) king on the channel as the first stage testing channel, i.e., the backup optimization channel of IBS.

At step 509, the IBS sends a "channel assignment optimization testing" message to each of NB (1)–ChX. After receiving the "channel assignment optimization testing" message, each of NB (1)–ChX determines whether there is a channel all NB(2) working on the channel have a respective backup idle channel. If one of NB (1)–ChX detects existence of a channel all NB (2) on the channel have a respective backup idle channel, then it sends a "channel assignment optimization response" message having "feasible" indication. Otherwise, if no such channel is detected, then it will further request the neighboring base stations (NB (2)) to perform the channel assignment optimization path searching process, respectively; on this basis, the NB (2) will possibly further request the lower-level neighboring base stations (NB (3)) to perform the channel assignment optimization path searching process, respectively; therefore, the channel assignment optimization path searching process will be iteratively performed downwardly stage by stage.

At step 511, when each of all "channel assignment optimization testing" messages sent by the IBS to each of NB (1)–ChX receives a "channel assignment optimization response" message having "feasible" indication, it indicates that a channel assignment optimization path has been successfully detected such that vacating an idle channel for the IBS as its working channel can be realized, and then the flow proceeds to step 513.

Otherwise, if any NB (1)–ChX sends a "channel assignment optimization response" message having "infeasible" indication to the IBS, or a response message to a certain "channel assignment optimization testing" message is not received yet after waiting for a predetermined time period, then it returns to step 505. In the case that the IBS determines that the local channel list still has remaining channels besides the tested channel X, it further performs steps 507-511 to detect a channel assignment optimization path.

At step 513, the IBS saves the information about the detected channel assignment optimization path, comprising channel switching times, the base station ID that sends the path searching request, and the channel desired to be switched to, etc.

At step 515, the IBS sends a "channel switching request" to each of the first stage neighboring base stations that work on the channel (suppose channel X) as determined by the optimization path; and the flow proceeds to step 517 to wait for a response of each of NB (1)–ChN to this message.

If each of all "channel switching request" messages obtains a response having "success" indication, it indicates that an idle channel has successfully vacated for the IBS as a dedicated working channel X through multiple iteration switching processes. In this case, the IBS resides on the channel X and starts message transmission (step 519).

If all channels have been tested at step 505 and no feasible channel assignment optimization path is detected, i.e., it is impossible to vacate an idle channel for the IBS through multiple iteration switching processes (step 506). In this case, the IBS must suspend its transmission, or has to share a channel with its neighboring base stations to realize message transmission.

Figure 6:
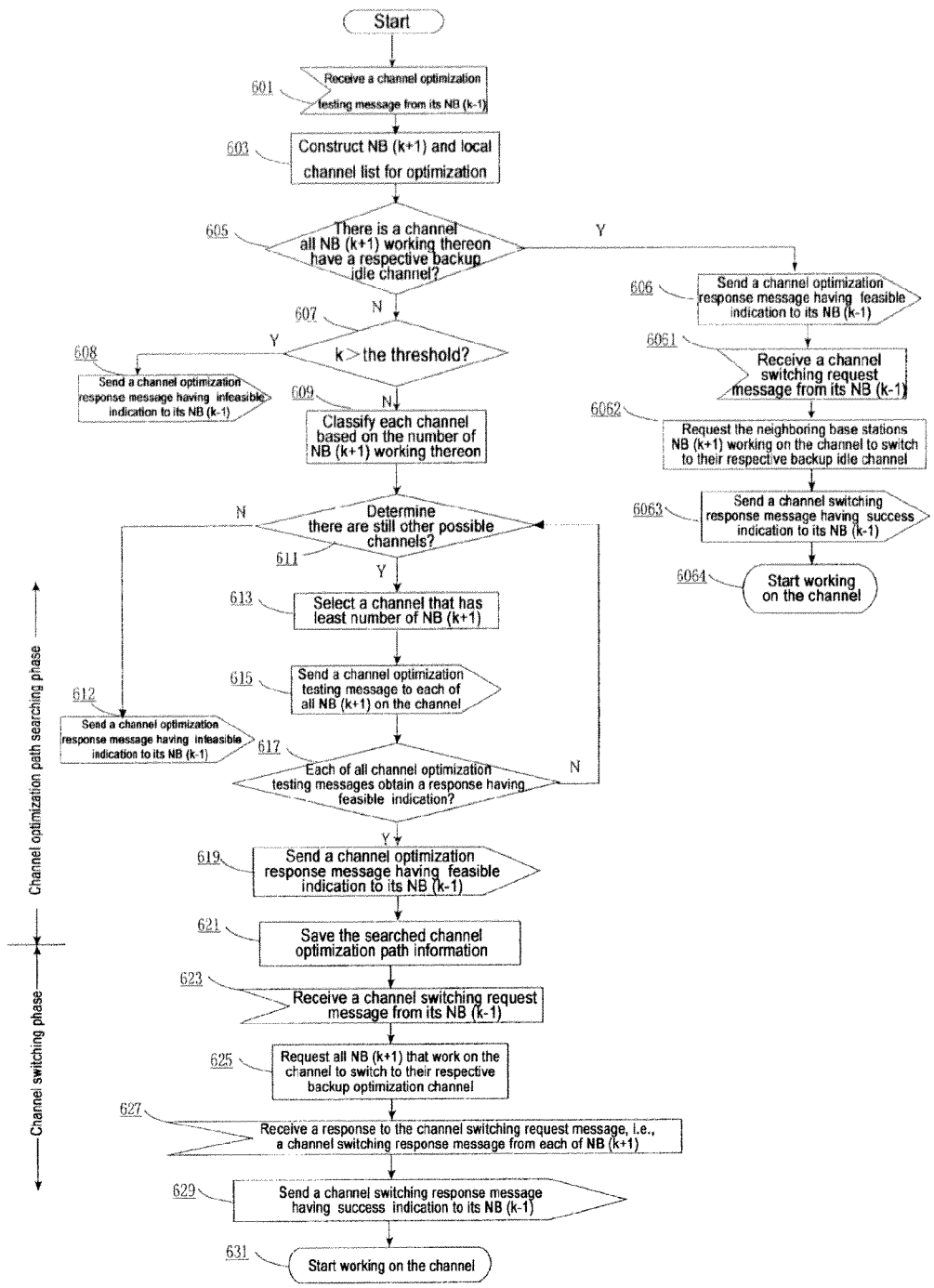
FIG. 6 illustrates a method flow that is implemented by a kth neighboring base station NB (k) according to the channel assignment optimization mechanism that is iterated for multiple times according to the present invention.

Hereinafter, referring to FIG. 6, the relevant flow that is implemented by each of kth stage neighboring base stations NB (k) according to the channel assignment optimization mechanism that is iterated for multiple times according to the present invention will be described in detail. For the sake of illustration, it is supposed here that the NB (k) are working on O channel.

First, at step 601, corresponding NB (k)–CHO receives the "channel assignment optimization testing" message from its NB (k–1)–CHM.

Then, at step 603, all NB (k+1) are grouped by working channels, and NB (k+1) that work on the same working channel are classified into one group.

At step 605, it determines whether there is a channel all NB (k+1) working on the channel have a respective backup idle channel.

In case of existence of such channel (suppose channel R), the flow enters into step S606, where the corresponding NB (k)–CHO sends a "channel assignment optimization response" message having "feasible" indication to its NB (k−1)–CHM.

At step 6061, when the corresponding NB (k)–CHO receives a channel switching request message from its NB (k−1)–CHM, the flow enters into step 6062 to request the NB (k+1)–CHR working on channel R to switch to their respective backup idle channel so as to vacate channel R for the corresponding NB (k)–CHO.

At step 6063, the corresponding NB (k)–CHO sends a "channel switching response" message having "success" indication to its NB (k−1)–CHM, and switches to channel R to work in step 6064.

In case of determining that there is no channel all NB (k+1) working on the channel have a respective backup idle channel at step 605, the flow proceeds to step 607, where it determines whether the iteration times k exceeds the predetermined threshold. It should be noted that setting of the iteration threshold is to avoid endlessly performing the iteration process (i.e., convergence issue).

Therefore, during the process of channel assignment optimization path searching, if the kth stage neighboring base stations NB (k) detect that the iteration times k>the threshold, the flow enters into step 608, where it will not request the neighboring base stations NB (k+1) to initiate the channel assignment optimization path searching process, and the corresponding NB (k)–CHO sends a "channel assignment optimization response" message having "infeasible" indication to its upper-stage neighboring base station NB (k−1). If the iteration times k does not exceed the threshold, the flow enters into step 609.

At step 609, the corresponding NB (k)–CHO groups the NB (k+1) working on each channel by working channel, wherein NB (k+1) working on the same channel are grouped into one group. At step 613, the corresponding NB (k)–CHO selects the channel having least number of NB (k+1) as the (k+1) stage testing channel, i.e., the backup optimization channel of NB (k) (suppose S). At step 615, the corresponding NB (k)–CHO sends a "channel assignment optimization testing" message to each of NB (k+1)–CHS. If at step 617, a response having "feasible" indication is received for each "channel assignment optimization testing" message that is sent to each of NB (k+1)–CHS, then at step 619, the corresponding NB (k)–CEO sends a "channel assignment optimization response" message having "feasible" indication to its NB (k−1)–CHM.

If at step 617, the corresponding NB (k)–CHO receives any "channel assignment optimization response" having "infeasible" indication or does not receive response message of a certain "channel assignment optimization testing" message after waiting for a certain time, the flow returns to step 611 to continue selecting a channel that has least number of NB (k+1) among the channels (i.e., remaining channels) other than channel S, as a new (k+1) stage testing channel, and to continue performing steps 613-617 with respect to NB (k) that work on the kth stage testing channel.

If all channels are tested, but the channel assignment optimization path that may vacate the Wb working channel is not detected yet, then the flow turns into step 612, it sends a "channel assignment optimization response" message having "infeasible" indication to its NB (k−1)–CHM.

At step 621, the corresponding NB (k) saves the information about the detected channel assignment optimization path, comprising channel switching times, the base station ID that sends the path searching request, and the channel desired to be switched to, etc.

Steps 623-629 describe a process that is performed by the corresponding NB (k) during the channel switching phase. Suppose it is determined through channel assignment optimization path searching process that NB (k−1)-CHM, NB (k)-CHO, and NB (k+1)-CHS are on the path. When the corresponding NB (k)–CHO receives the channel switching request message from its NB (k−1)–CHM at step 623, step 625 is performed. At step 625, the corresponding NB (k)–CHO requests the NB (k+1)–CHS to Vacate a channel S through channel switching, and the flow enters into step 627 to wait for the response from each of NB (k+1)–CHS to the channel switching request message. If the corresponding NB (k)–CHO receives a channel switching response message having "success" indication from each of NB (k+1)–CHS, it indicates that the channel S has been vacated by its neighboring base stations. Thus, the corresponding NB (k)–CHO will at step 629 sends a channel switching response message having "success" indication to its NB (k−1); at step 631, the channel is switched to S for performing message transmission work.

It should be noted that, during the channel switching process, if switching failure occurs at any stage neighboring base stations, the switching that has been completed by the lower stages should be restored to the original state, and the channel switching response message having "failure" indication is forwarded stage by stage till to IBS; the IBS will perform again the channel assignment optimization path searching process to the remaining channels.

During the channel assignment optimization path searching process, IBS and each stage neighboring base stations should save the information about the channel assignment optimization path searching result of this time, such that when performing the channel assignment optimization path searching in the future, the saved information about channel assignment optimization path may be used to quickly detect the channel assignment optimization path.

Table 1 illustrates an example of channel assignment optimization path information as saved in the base station (suppose base station c).

TABLE 1

| content of channel assignment optimization path information | | |
|---|---|---|
| ID of neighboring base station that sends a path searching request | Channels that are switched to | Total channel switching times |
| Base station a | Channel y | 6 |
|  | Channel z | 4 |
| Base station b | Channel y | 4 |
| Base station c | Channel z | 3 |
|  | Channel x | 5 |

It should be noted that the "total channel switching times" refers to the sum of channel switching times performed by the base stations on the channel assignment optimization path for vacating an idle channel. For example, as illustrated in table 1, if the base station a wants to change the channel assignment of neighboring base stations so as to obtain channel y as its working channel, then these base stations (comprising its neighboring base stations, the base stations of its neighboring base stations, . . . need to perform channel switching for 6 times in total.

If the "total channel switching times" is regarded as a distance vector, some distance-vector algorithms (for example, Bellman-Ford algorithm) may be used to calculate the most optimal path. Here, the most optimal path is represented as the channel assignment optimization path that vacates an idle channel with least channel switching times. Calculating the most optimal path based on the distance-vector algorithm does not need frequently exchanging channel assignment optimization information among neighboring base stations.

When performing the channel assignment optimization path searching in the future, the base station may use the channel assignment optimization path information that has been saved in the information table to detect a channel assignment optimization path; if a feasible channel assignment optimization path cannot be successfully detected based on such information, the base station requires its next lower stage base stations to initiate the channel assignment optimization path searching process. Apparently, based on a prior information table information, the time consumed for channel assignment optimization path searching will be greatly reduced and the corresponding resource consumed for transmitting the "channel assignment optimization testing" and "channel assignment optimization response" messages will be saved.

Figure 2:
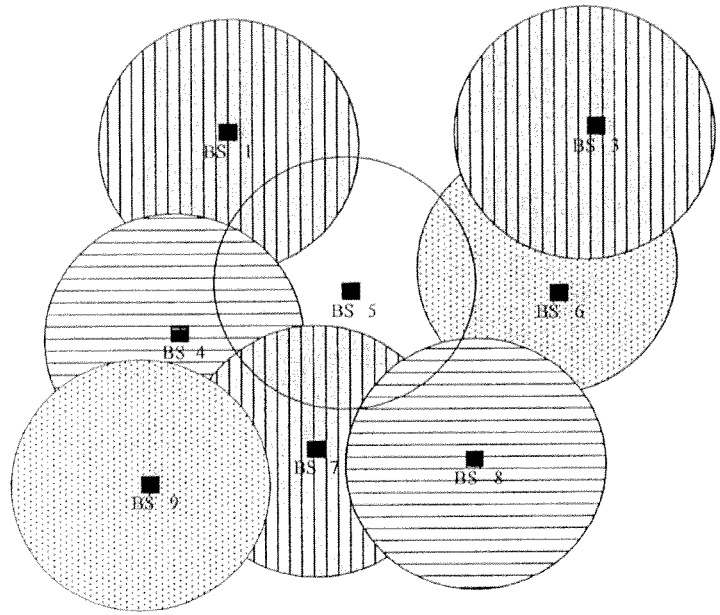
FIG. 2 illustrates a schematic diagram of initial channel assignment for IBS (BS 5) and its neighboring base stations and the initial channel assignment information before obtaining an idle channel as a working channel.
Figure 3:
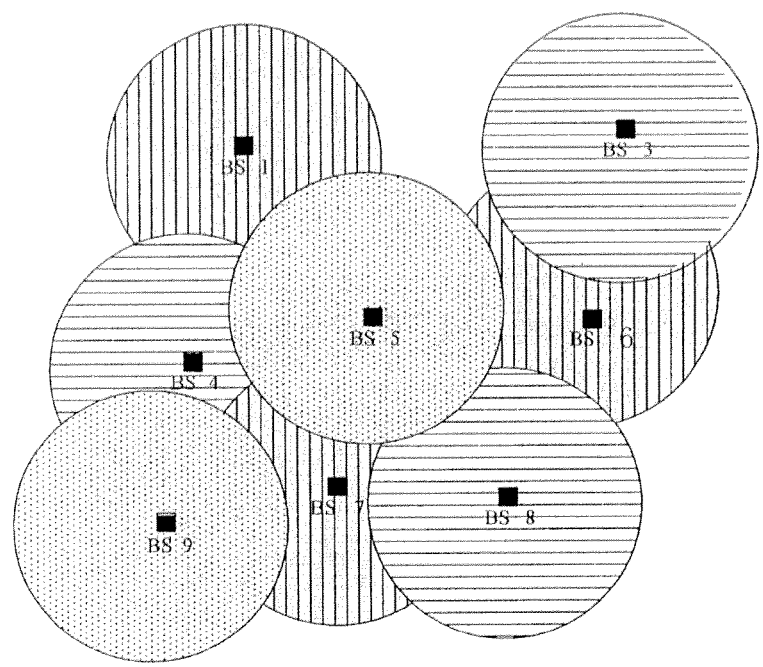
FIG. 3 illustrates an example of channel assignment optimization based on the initial scenario of FIG. 2 and implemented according to the present invention.

Hereinafter, how to implement the channel assignment optimization as illustrated in FIG. 3 will be illustrated with the scenario of FIG. 2 as an example.

Because the IBS (BS 5) cannot detect a channel all NB (1) working on the channel have a respective backup idle channel, it is required to employ a multi-iteration based channel assignment optimization process to vacate an idle cannel therefor.

1) The IBS classifies these channels by the number of NB (1) that work on the channels, and selects channel 3 that only has one neighboring base station (BS 6) working thereon.

2) the IBS sends a "channel assignment optimization testing" message to BS 6. After receiving the "channel assignment optimization testing" message, BS 6 determines whether there is a channel all NB (2) working on the channel have a respective backup idle channel.

3) BS 6 detects that there is only one NB (2) (i.e., BS 3) on channel 1, and it is known that BS 3 may vacate channel 1 for BS 6 by switching to channel 2.

4) BS 6 sends a "channel assignment optimization response" message having "feasible" indication to the IBS.

5) When the IBS receives the "channel assignment optimization response" message having "feasible" indication from the BS 6, the IBS successfully searches a vacated idle channel as its dedicated optimization channel. The path for channel switching is:

a) BS 3 switches from channel 1 to channel 2;
a) BS 6 switches from channel 3 to channel 1;
c) BS 5 switches to channel 3.

During the channel switching process, BS 3, BS 6, and BS 5 switch in sequence to the selected channel based on the channel switching path. Finally, the channel 3 is vacated and is used by the IBS (BS 5) as its dedicated working channel.

Figure 7:
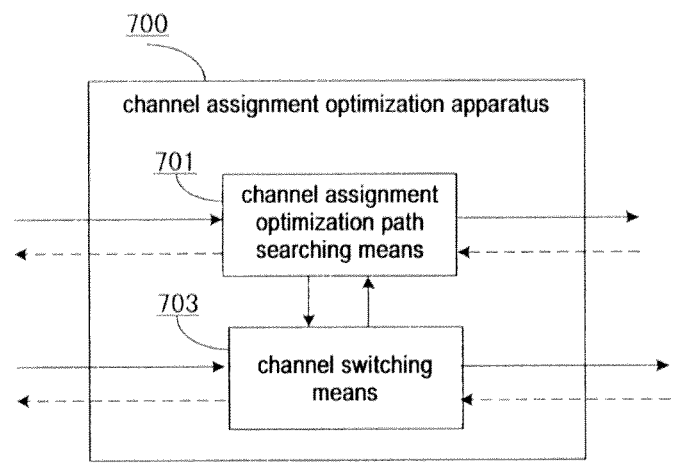
FIG. 7 illustrates a channel assignment optimization apparatus according to embodiments of the present invention.

FIG. 7 illustrates a channel assignment optimization apparatus 700 distributed within the IBS and multi-stage neighboring base stations of the IBS according to the present invention.

At a current stage neighboring base station NB (k) in the multi-stage neighboring base stations, the channel assignment optimization apparatus 700 comprises: channel assignment optimization path searching means 701 for receiving a channel assignment optimization testing message from its upper-stage neighboring base station NB (k−1); determining whether there is a channel all lower-stage neighboring base stations NB (k+1) working on the channel have a respective backup idle channel; if there is a channel all lower-stage neighboring base stations NB(k+1) working on the channel have a respective backup idle channel, then a channel assignment optimization response message having "feasible" indication is sent to its upper-stage neighboring base station NB (k−1); and channel switching means 703, for requesting each of all lower-stage neighboring base stations NB (k+1) that work on the channel to switch to their respective backup idle channel when receiving a channel switching request message from its upper-stage neighboring base station NB (k−1); and sending a channel switching response message having "success" indication to its upper-stage neighboring base station NB (k−1) when receiving the channel switching response message having "success" indication from each of all lower-stage neighboring base stations NB (k+1), and switching the working channel of the current-stage neighboring base station NB (k) to the channel.

If there is no channel all lower-stage neighboring base stations NB (k+1) working on the channel have a respective backup idle channel, the channel assignment optimization path searching means 701 determines whether the stage number k of the current-stage neighboring base station NB (k) exceeds the predetermined threshold. If it exceeds the predetermined threshold, the channel assignment optimization path searching means 701 sends a channel assignment optimization response message having "infeasible" indication to its upper-stage neighboring base station NB (k−1); if it does not exceed the predetermined threshold, then the channel assignment optimization path searching means 701 classifies each channel based on the number of lower-stage neighboring base stations NB (k+1) that work on respective channel; then, determines whether there still have channels that are still available for testing; if there are no channels that are available for testing, then the channel assignment optimization path searching means 701 sends a channel assignment optimization response message having "infeasible" indication to its upper-stage neighboring base station NB (k−1). If there are still channels that are available for testing, then the channel assignment optimization path searching means 701 selects a channel that has least number of lower-stage neighboring base stations (NB (k+1) from the channels that are available for testing, as the backup optimization channel of the current-stage base station NB (k); and sends a channel assignment optimization testing message to each of all lower-stage neighboring base stations NB (k+1) that work on the selected channel.

At the current-stage neighboring base station NB (k), the channel assignment optimization path searching means 701 further determines whether each of all channel assignment testing messages receives a channel assignment optimization response message having "feasible" indication; if not each of all channel assignment optimization testing messages receives the channel assignment optimization response message having "feasible" indication, the following steps are performed repeatedly: determining whether there still have channels that are available for testing; if there are no channels that are available for testing, then sending a channel assignment optimization response message having "infeasible" indication to its upper-stage neighboring base station NB (k−1); if there are still channels that are available for testing, then selecting a channel that has least number of lower-stage neighboring base stations NB (k+1) from the channels that are available for testing, as the backup optimization channel of the current-stage neighboring base station NB (k); and sending a channel assignment optimization testing message to each of all lower-stage neighboring base stations NB (k+1) that work on the selected channel.

If each of all channel assignment optimization testing messages receives a channel assignment optimization response message having "feasible" indication, then the channel assignment optimization path searching means 701 sends a channel assignment optimization response message having "feasible" indication to its upper-stage neighboring base station NB (k−1).

At the current-stage neighboring base station NB (k), when the channel switching means 703 receives a channel switching request message from its upper-stage neighboring base station NB (k−1), it requests all lower-stage neighboring base stations NB (k+1) that work on the selected channel to switch to their respective backup optimization channel or backup idle channel. After the channel switching response message having "success" indication is received from each of all lower-stage neighboring base stations NB (k+1), a channel switching response message having "success" indication is sent to its upper-stage neighboring base station NB (k−1), and the current working channel is switched to the selected channel.

The channel switching means 703 is further configured to: if switching failure occurs at any stage neighboring base stations, restore the switching that has been completed at each of lower stages to the original state, and send a channel switching response message having "failure" indication to its upper-stage neighboring base station.

At the IBS, the channel assignment optimization path searching means 701 of the channel assignment optimization apparatus 700 may be configured to: in case of determining that no idle channel exists and there is no channel all first stage neighboring base stations working on the channel have a respective backup idle channel, classify each channel based on the number of first stage neighboring base stations working thereon; determine whether there still have channels that are available for testing; if the channels that are available for testing still exist, select a channel that has least number of first stage neighboring base stations from the channels that are available for testing, as the backup optimization channel of the IBS; send a channel assignment optimization testing message to each of all first stage neighboring base stations working on the selected channel. The channel switching means 703 of the channel assignment optimization apparatus 700 is configured to: after each of all channel assignment optimization testing messages that are sent to the first stage neighboring base stations NB (1) obtains a channel assignment optimization response message having "feasible" indication, request all lower-stage neighboring base stations working on the selected channel switch to their respective backup optimization channel or backup idle channel when sending the channel switching request message to the corresponding first stage neighboring base station NB (1).

when a channel switching response message having "success" indication is received from each of the first stage neighboring base stations NB(1), the working channel of the IBS is switched to its backup optimization channel, the backup optimization channel being the idle channel that is vacated by the first stage neighboring base stations NB (1) for the initialization base station.

At the IBS, when the channel switching means 703 receives a channel switching response message having "failure" indication, the channel assignment optimization path searching means 701 is configured to determine whether there still have channels that are available for testing; if channels that are available for testing still exist, select a channel that has least number of first stage neighboring stations from the channels that are available for testing, as the backup optimization channel of the IBS; and send a channel assignment optimization testing message to each of the first stage neighboring base stations NB (1) working on the selected channel.

The channel assignment optimization apparatus 700 further comprises: means (not shown) for saving the information about the channel assignment optimization path searching result at the initialization base station and the multi-stage neighboring base stations of the initialization base station; and means (not shown) for calculating the most optimal channel assignment optimization path based on the information.

The present invention provides a multi-iteration based distributed channel assignment optimization mechanism.

A basic channel assignment optimization process is divided into two phases: channel assignment optimization path searching phase and channel switching phase. During the channel assignment optimization path searching phase, the IBS negotiates with neighboring base stations so as to detect a channel assignment optimization path through multiple iterations. After successfully detecting a channel assignment optimization path, IBS and its neighboring base stations initiate a channel switching process, such that useless channel switching may be avoided.

Besides, in order to avoid the problem of incapability of timely convergence during the iteration process, a threshold of iteration times is preset. Once the current iteration times>the threshold, the channel assignment optimization path searching process on the current channel will exit and the process switches to other channel to detect another path.

Besides, in order to reduce the time consumed for searching the channel assignment optimization path, each base station saves the information about the channel assignment optimization path searching result. Based on this information, the distance-vector algorithms (for example, Bellman-Ford algorithm) may be used to calculate the most optimal channel assignment optimization path (having the least channel switching times).

Apparently, compared with the traditional single-hop channel assignment mechanism as defined in 802.16h, the technical solution of the present invention may realize a more optimal channel assignment through a plurality of channel switching processes. If the IBS cannot detect any channel all neighboring base stations working on the channel have a respective backup idle channel, then the channel assignment optimization process as defined in 802.16h cannot vacate an idle channel to be available for IBS. However, based on the technical solution of this invention, the chance of the IBS in obtaining a dedicated channel will be enhanced, the frequency utilization will be improved, and a better QoS will be provided for co-existence systems, such that better multi-system coexistence may be realized.

Although the present invention has been illustrated with reference to the preferred embodiments of the present invention, those skilled in the art would understand, without departing from the spirit and scope of the present invention, various amendments, replacements and alterations may be performed to the present invention. Thus, the present invention should not be defined by the aforementioned embodiments, but should be defined by the appended claims and their equivalents.

What is claimed is:

1. A channel assignment optimization method in a communication system, wherein the communication system comprises an initialization base station, and the multi-stage neighboring base stations of the initialization base station, at a current-stage neighboring base station among the multi-stage neighboring base stations, the method comprises steps of:

receiving a channel assignment optimization testing message from an upper-stage neighboring base station;

determining whether there is a channel all lower-stage neighboring base stations working on the channel have a respective backup idle channel;

if there is a channel all lower-stage neighboring base stations working on the channel have a respective backup idle channel, sending a channel assignment optimization response message having "feasible" indication to the upper-stage neighboring base station; and when a channel switching request message is received from the upper-stage neighboring base station, requesting all lower-stage neighboring base stations that work on the channel to switch to their respective backup idle channel;

after a channel switching response message having "success" indication is received from each of all lower-stage neighboring base stations, sending a channel switching response message having "success" indication to the upper-stage neighboring base station, and making the current-stage neighboring base station work on the channel.

2. The method according to claim 1, wherein at the current-stage neighboring base station, the method further comprises steps of:

if there is no channel all lower-stage neighboring base stations working on the channel have a respective backup idle channel, determining whether the stage number of the current-stage neighboring base station exceeds a predetermined threshold;

if it exceeds the predetermined threshold, sending a channel assignment optimization response message having "infeasible" indication to the upper-stage neighboring base station; if it does not exceed the predetermined threshold, then classifying each channel based on the number of lower-stage neighboring base stations working thereon;

a) determining whether there still have channels that are available for testing;

if there are no channels that are available for testing, then sending a channel assignment optimization response message having "infeasible" indication to the upper-stage neighboring base station;

if there still have channels that are available for testing, then selecting a channel that has least number of lower-stage neighboring base stations working thereon from the channels that are available for testing, as the backup optimization channel of the current-stage neighboring base station; and sending a channel assignment optimization testing message to each of all lower-stage neighboring base stations that work on the selected channel.

3. The method according to claim 2, at the current-stage neighboring base station, the method further comprises steps of:

determining whether each of all channel assignment optimization testing messages receives a channel assignment optimization response message having "feasible" indication;

if not each of all channel assignment optimization testing messages receives a channel assignment optimization response message having "feasible" indication, returning to a):

if each of all channel assignment optimization testing messages receives the channel assignment optimization response message having "feasible" indication, sending a channel assignment optimization response message having "feasible" indication to the upper-stage neighboring base station;

when receiving a channel switching request message from the upper-stage neighboring base station, requesting all lower-stage neighboring base stations working on the selected channel to their respective backup optimization channel or backup idle channel;

after a channel switching response message having "success" indication is received from each of all lower-stage neighboring base stations, sending a channel switching response message having "success" indication to the upper-stage neighboring base station, and making the current-stage neighboring base station work on the selected channel.

4. The method according to claim 1, wherein at the initialization base station, the method comprises steps of:

in the case of determining that no idle channel exists and there is no channel all first-stage neighboring base stations working thereon have a respective backup idle channel, classifying each channel based on the number of first-stage neighboring base stations working thereon;

determining whether there still have channels that are available for testing;

if there still have channels that are available for testing, selecting a channel that has least number of first-stage neighboring base stations from the channels that are available for testing, as the backup optimization channel of the initialization base station;

sending a channel assignment optimization testing message to each of first-stage neighboring base stations that work on the selected channel.

5. The method according to claim 1, at the initialization base station, the method further comprises:

if each of all channel assignment optimization testing messages that are sent to the first stage neighboring base stations receives a channel assignment optimization response message having "feasible" indication, requesting all lower-stage neighboring base stations working on the selected channel to switch to their respective backup optimization channel or backup idle channel when sending the channel switching request message to corresponding first-stage neighboring base station.

6. The method according to claim 1, at the initialization base station, the method further comprises steps of:

when receiving a channel switching response message having "success" indication from each of all the first-stage neighboring base stations, making the initialization base station work on its backup optimization channel, the backup optimization channel being the idle channel that is vacated by the fist-stage neighboring base stations for the initialization base station.

7. The method according to claim 1, wherein if switching failure occurs at any stage neighboring base stations, the switching that has been completed at each of lower stages is restored to the original state, and a channel switching response message having "failure" indication is sent to the upper-stage neighboring base station wherein when the channel switching response message having "failure" indication is forwarded upward stage by stage to the initialization base station, determining whether there still have channels that are available for testing;
  if there still have channels that are available for testing, selecting a channel that has least number of first-stage neghboring base stations from the channels that are available for testing, as the backup optimization channel of the it initialization base station;
  sending a channel assignment optimization testing message to each of all first-stage neighboring base stations that work on the selected channel.

8. A channel assignment optimization apparatus in a communication system, wherein the communication system comprises an initialization base station, and multi-stage neighboring base stations of the initialization base station,
  at a current-stage neighboring base station among the multi-stage neighboring base stations, the channel assignment optimization apparatus comprises:
  a channel assignment optimization path searching means configured to receive a channel assignment optimization testing message from an upper-stage neighboring base station; determine whether there is a channel all lower-stage neighboring base stations working thereon have a respective backup idle channel; if there is a channel all lower-stage neighboring base stations working thereon have a respective backup idle channel, send a channel assignment optimization response message having "feasible" indication to the upper-stage neighboring base station; and
  channel switching means, configured to when a channel switching request message is received from the upper-stage neighboring base station, request all lower-stage neighboring base stations working on the selected channel to switch to their respective backup optimization channel or backup idle channel; when a channel switching response message having "success" indication is received from each of all lower-stage neighboring base stations, send a channel switching response message having "success" indication to the upper-stage neighboring base station, and switch the working channel of the current-stage neighboring base station to the selected channel.

9. The apparatus according to claim 8, wherein at the current-stage neighboring base station, the channel assignment optimization path searching means is further configured to:
  if there is no channel all lower-stage neighboring base stations working thereon have a respective backup idle channel, determine whether the stage number of the current-stage neighboring base station exceeds a predetermined threshold;
  if it exceeds the predetermined threshold, then send a channel assignment optimization response message having "infeasible" indication to the upper-stage neighboring base station;
  if it does not exceed the predetermined threshold, classify each channel based on the number of lower-stage neighboring base stations that work thereon;
  a) determine whether there still have channels that are available for testing; if there are no channels that are available for testing, send a channel assignment optimization response message having "infeasible" indication to the upper-stage neighboring base station;
  if there still have channels that are available for testing, select a channel that has least number of first-stage neighboring base stations from the channels that are available for testing, as the backup optimization channel of the current-stage base station; and
  send a channel assignment optimization testing message to each of all lower-stage neighboring base stations that work on the selected channel.

10. The apparatus according to claim 9, wherein at the current-stage neighboring base station, the channel assignment optimization path searching means is further configured to:
  determine whether each of all channel assignment optimization testing messages obtains a channel assignment optimization response message having "feasible" indication;
  if not each of all channel assignment optimization testing messages obtains a channel assignment optimization response message having "feasible" indication, return to a);
  if each of all channel assignment optimization testing messages receives the channel assignment optimization response message having "feasible" indication, send a channel assignment optimization response message having "feasible" indication to the upper-stage neighboring base station;
  at the current-stage neighboring base station, the channel switching means is further configured to:
  when receiving a channel switching request message from the upper-stage neighboring base station, request all lower-stage neighboring base stations working on the selected channel to switch to their respective backup optimization channel or backup idle channel;
  after a channel switching response message having "success" indication is received from each of all lower-stage neighboring base stations, send a channel switching response message having "success" indication to the upper-stage neighboring base station, and switch the working channel of the current-stage neighboring base station to the selected channel.

11. The apparatus according to claim 8, wherein at the initialization base station, the channel assignment optimization apparatus comprises:
  channel assignment optimization path searching means configured to when it is determined no idle channel exists and there is no channel all first-stage neighboring base stations working thereon have a respective backup idle channel, classify each channel based on the number of first-stage neighboring base stations working thereon;
  determine whether there still have channels that are available for testing; if there are still channels that are available for testing, select a channel that has least number of first stage neighboring base stations from the channels that are available for testing, as the backup optimization channel of the initialization base station; send a channel assignment optimization testing message to each of all first-stage neighboring base stations working on the selected channel.

12. The apparatus according to claim 8, wherein at the initialization base station, the channel assignment optimization apparatus further comprises:
  channel switching means configured to:
  if each of all channel assignment optimization testing messages that are sent to the first-stage neighboring base stations obtains a channel assignment optimization response message having "feasible" indication, request all lower-stage neighboring base stations working on the selected channel to switch to their respective optimization channel or backup idle channel when sending a channel switching request message to the corresponding first-stage neighboring base station.

13. The apparatus according to claim 8, wherein at the initialization base station, the channel assignment optimization apparatus further comprises:

channel switching means further configured to:

when a channel switching response message having "success" indication is received from each of all the first stage neighboring base stations, switch the working channel of the initialization base station to its backup optimization channel, the backup optimization channel being the idle channel that is vacated by the first stage neighboring base stations for the initialization base station.

14. The apparatus according to claim 8, wherein the channel switching means is configured to: if switching failure occurs at any stage neighboring base stations, restore the switching that has been completed at each of lower stages to the original state, and send a channel switching response message having "failure" indication to the upper-stage neighboring base station wherein at the initialization base station, when the channel switching means receives a channel switching response message having "failure" indication, the channel assignment optimization path searching means is configured to:

determine whether there still have channels that are for testing;

if there are still channels that are available for testing, select a channel that has least number of first stage neighboring base stations from the channels that are available for testing, as the backup optimization channel of the initialization base station;

send a channel assignment optimization testing message to each of all first stage neighboring base stations that work on the selected channel.

\* \* \* \* \*